US009930156B2

(12) United States Patent
Zhang et al.

(10) Patent No.: US 9,930,156 B2
(45) Date of Patent: Mar. 27, 2018

(54) METHOD AND APPARATUS FOR RECOMMENDING CONTACT INFORMATION

(71) Applicant: Xiaomi Inc., Beijing (CN)

(72) Inventors: Tao Zhang, Beijing (CN); Baichao Wang, Beijing (CN); Wendi Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/207,130

(22) Filed: Jul. 11, 2016

(65) Prior Publication Data
US 2017/0034324 A1    Feb. 2, 2017

(30) Foreign Application Priority Data
Jul. 30, 2015    (CN) .......................... 2015 1 0459792

(51) Int. Cl.
G06K 9/00        (2006.01)
H04M 1/2745    (2006.01)
G06Q 50/00      (2012.01)

(52) U.S. Cl.
CPC .... *H04M 1/27455* (2013.01); *G06K 9/00255* (2013.01); *G06K 9/00288* (2013.01); *G06Q 50/01* (2013.01); *G06K 2009/00322* (2013.01)

(58) Field of Classification Search
None
See application file for complete search history.

(56) References Cited

U.S. PATENT DOCUMENTS 8,457,366 B2    6/2013    Cheswick
8,498,491 B1 *  7/2013    Steffens ............... G06K 9/6292
                                                        382/224
(Continued)

FOREIGN PATENT DOCUMENTS

CN    102760077 A    10/2012
CN    102930457 A    2/2013
(Continued)

OTHER PUBLICATIONS

International Search Report issued in International Application No. PCT/CN2015/097802.
(Continued)

*Primary Examiner* — Sumati Lefkowitz
*Assistant Examiner* — David Perlman
(74) *Attorney, Agent, or Firm* — Brinks, Gilson & Lione

(57) ABSTRACT

The present disclosure, pertaining to the field of terminal technologies, relates to a method and apparatus for recommending contact information. The method may include: determining an age of an owner of a mobile terminal; determining, based on the determined age of the owner and stored contact photos of a plurality of contacts, a candidate contact from the plurality of contacts; and displaying, in response to receiving a share instruction with respect to a designated image, contact information of the determined candidate contact, the designated image being any image in a photo album to be shared. According to the present disclosure, one or more candidate contacts are determined from a plurality of contacts, and upon receipt of a share instruction with respect to a designated image, contact information of the determined candidate contact is displayed. This may improve speed and accuracy of searching for contact information, reduce search time, and enhance image sharing efficiency.

15 Claims, 7 Drawing Sheets

(56) References Cited

U.S. PATENT DOCUMENTS

| | | | |
|---|---|---|---|
| 9,047,504 | B1 | 6/2015 | Ramaswamy et al. |
| 2006/0040644 | A1 | 2/2006 | Gibbs et al. |
| 2006/0209690 | A1 | 9/2006 | Brooke |
| 2008/0207271 | A1 | 8/2008 | Krutik et al. |
| 2013/0219339 | A1* | 8/2013 | Wiese ............... G06F 3/04847 715/833 |
| 2013/0286223 | A1* | 10/2013 | Latta ............... H04N 1/00347 348/207.1 |
| 2013/0325870 | A1* | 12/2013 | Rouse ............... G06F 17/30707 707/741 |
| 2014/0280058 | A1* | 9/2014 | St. Clair ............... G06F 3/048 707/722 |
| 2015/0332087 | A1* | 11/2015 | Joshi ............... G06K 9/00 382/203 |

FOREIGN PATENT DOCUMENTS

| | | |
|---|---|---|
| CN | 103412877 A | 11/2013 |
| CN | 103414814 A | 11/2013 |
| CN | 103634623 A | 3/2014 |
| CN | 103870547 A | 6/2014 |
| CN | 104063150 A | 9/2014 |
| CN | 104243276 A | 12/2014 |
| CN | 104317932 A | 1/2015 |
| CN | 104714633 A | 6/2015 |
| CN | 105069073 A | 11/2015 |
| EA | 013298 B1 | 4/2010 |
| JP | 2001-265697 A | 9/2001 |
| JP | 2005-267146 A | 9/2005 |
| JP | 2007-102683 A | 4/2007 |
| JP | 2013-219666 A | 10/2013 |
| JP | 2015-072633 A | 4/2015 |
| KR | 10-2002-0058618 A | 7/2002 |
| KR | 10-2013-0049099 A | 5/2013 |
| KR | 10-2014-0127309 A | 11/2014 |
| RU | 2007/121029 A | 1/2009 |
| RU | 2 378 987 C1 | 1/2010 |
| RU | 2 488 970 C2 | 7/2013 |
| RU | 135 431 U1 | 12/2013 |
| WO | WO 2010/151717 A1 | 12/2010 |
| WO | WO 2013/082991 A1 | 6/2013 |

OTHER PUBLICATIONS

English Translation of International Search Report dated Apr. 28, 2016 for International Application No. PCT/CN2015/097802, 6 pages.

Extended European Search Report dated Nov. 21, 2016 for European Application No. 16181037.9, 11 pages.

Fu, Yun et al., "Age Synthesis and Estimation via Faces: A Survey," IEEE Transactions on Pattern Analysis and Machine Intelligence, vol. 32, No. 11, Nov. 2010, pp. 1955-1976.

Office Action dated Mar. 27, 2017 for Korean Application No. 10-2016-7004057, 6 pages.

Office Action dated May 17, 2017 for Russian Application No. 2016111336/08, 14 pages.

Office Action dated Sep. 26, 2017 for Japanese Application No. 2017-530396, 3 pages.

Ji, Chuanguo, "Design and Realization of Mobile Client for Friend-making Community Based on Picture Sharing," 2012, Published in China Master's Theses Full-text Database in 2013, 69 pages.

Xia, Shuangrong, "Design and Implementation of the Client of Multidimensional Image Management System," 2009, Published in China Master's Theses Full-text Database in 2011, 74 pages.

Office Action dated Jan. 3, 2018 for Chinese Application No. 201510459792.3, 4 pages.

* cited by examiner

METHOD AND APPARATUS FOR RECOMMENDING CONTACT INFORMATION

RELATED APPLICATIONS

This application claims priority to Chinese Patent Application No. 201510459792.3, filed on Jul. 30, 2015, the entire contents of which are incorporated herein by reference.

TECHNICAL FIELD

The present disclosure relates to the field of terminal technologies, and more particularly relates to a method and an apparatus for recommending contact information.

BACKGROUND

With rapid development of terminal technologies, more and more terminals having an image share function are emerging, such as mobile phones, tablet computers, and the like. Images may be transmitted between such terminals, thereby implementing image sharing among a plurality of terminals.

For example, when a terminal A shares an image to a terminal B, the terminal A may search for and select contact information corresponding to the terminal B from contact information stored by the terminal A itself, and afterwards, the terminal A may share the image to the terminal B via the selected contact information. However, when the terminal A stores a lot of contact information, it may take a relatively long time to search for the contact information corresponding to the terminal B from the stored contact information, and errors might occur in the searching. Therefore, a contact information recommendation method is urgently desired.

SUMMARY

The present disclosure provides methods and apparatuses for recommending contact information.

According to a first aspect of embodiments of the present disclosure, a method for recommending contact information is provided. The method may include determining, by a processor, an age of an owner of a mobile terminal and determining, by a processor, based on the determined age of the owner of the mobile terminal and stored contact photos of a plurality of contacts, a candidate contact from the plurality of contacts. The method may further include displaying, by a processor, in response to receiving a share instruction with respect to a designated image, contact information of the determined candidate contact, the designated image being any image in a photo album to be shared.

In an embodiment of the present disclosure, an age of an owner of a mobile terminal is determined. A candidate contact associated with the owner of the mobile terminal is determined from the plurality of contacts based on the determined age of the owner of the mobile terminal and stored contact photos of a plurality of contacts. In response to receipt of a share instruction with respect to a designated image, contact information of the determined candidate contact is displayed. In this way, the speed and accuracy of searching for contact information may be improved, the search time may be reduced, and the image sharing efficiency may be enhanced.

According to a second aspect of embodiments of the present disclosure, an apparatus for recommending contact information is provided. The apparatus may include a processor and a memory for storing instructions executable by the processor. The processor may be configured to determine an age of an owner of a mobile terminal and to determine, based on the determined age of the owner of the mobile terminal and stored contact photos of a plurality of contacts, a candidate contact from the plurality of contacts. The processor may further be configured to display, in response to receiving a share instruction with respect to a designated image, contact information of the determined candidate contact, the designated image being any image in a photo album to be shared.

According to a third aspect of embodiments of the present disclosure, there is provided a non-transitory computer-readable storage medium having stored therein instructions. The instructions, when executed by one or more processors of an apparatus, may cause the apparatus to determine an age of an owner of a mobile terminal and determine, based on the determined age of the owner of the mobile terminal and stored contact photos of a plurality of contacts, a candidate contact from the plurality of contacts. The instructions, when executed by one or more processors of an apparatus, may also cause the apparatus to display, in response to receiving a share instruction with respect to a designated image, contact information of the determined candidate contact, the designated image being any image in a photo album to be shared.

Technical solutions provided in embodiments of the present disclosure may achieve, inter alia, the following beneficial effects. An age of an owner of a mobile terminal is determined, a candidate contact is determined from the plurality of contacts based on the determined age of the owner of the mobile terminal and stored contact photos of a plurality of contacts; and in response to receipt of a share instruction with respect to a designated image, contact information of the determined candidate contact is displayed, wherein the designated image is any image in a photo album to be shared. In this way, the speed and accuracy of searching for contact information may be improved, the search time may be reduced, and the image sharing efficiency may be enhanced.

It shall be appreciated that the above general description and the detailed description hereinafter are only illustrative and exemplary, and do not limit the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
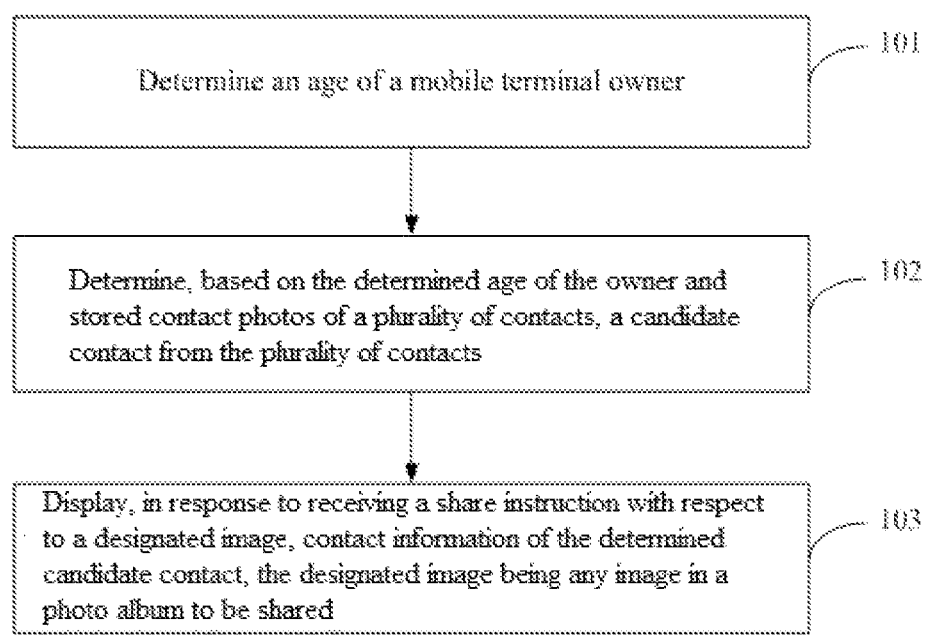
FIG. 1 is a flowchart illustrating a method for recommending contact information according to an exemplary embodiment of the present disclosure.

FIG. 1 is a flowchart illustrating a method for recommending contact information according to an exemplary embodiment of the present disclosure. As illustrated in FIG. 1, the method is applied in a terminal, and includes the following steps.

In step 101, an age of an owner of a mobile terminal is determined.

In step 102, a candidate contact is determined, based on the determined age of the owner of the mobile terminal and stored contact photos of a plurality of contacts, from the plurality of contacts.

In step 103, in response to receipt of a share instruction with respect to a designated image, contact information of the determined candidate contact is displayed, wherein the designated image is any image in a photo album to be shared.

In an embodiment of the present disclosure, the mobile terminal is configured to determine an age of an owner of a mobile terminal. The mobile terminal is further configured to determine a candidate contact from the plurality of contacts based on the determined age of the owner of the mobile terminal and stored contact photos of a plurality of contacts. The mobile terminal is further configured to display, in response to receipt of a share instruction with respect to a designated image, contact information of the candidate contact, wherein the designated image is any image in a photo album to be shared. In this way, the speed and accuracy of searching for contact information are improved, the search time is reduced, and the image sharing efficiency is enhanced.

In an embodiment of the present disclosure, the determining of the age of the owner of the mobile terminal includes acquiring a face image set of the owner of the mobile terminal and obtaining a respective age corresponding to each face image in the face image set of the owner by performing age identification for each face image in the face image set of the owner. The method may also include determining the age of the owner of the mobile terminal based on the respective age corresponding to each face image.

In an embodiment of the present disclosure, the mobile terminal is configured to determine the age of the owner of the mobile terminal. In this way, a basis is provided for determining an age group of the age of a candidate contact. The range of contacts considered when determining the candidate contact is thereby narrowed, and the speed for determining the candidate contact may be improved.

In an embodiment of the present disclosure, the acquiring of the face image set of the owner of the mobile terminal includes obtaining a plurality of face images by, in response to each receiving of an unlock instruction by the mobile terminal, automatically capturing a respective face image of a user who triggers the respective unlock instruction, with a camera or other image capture device associated with the mobile terminal. The plurality of face image sets may be obtained by categorizing each face image of the plurality of face images as being of a respective person, and obtaining a face image set for each distinct person of the respective persons, by associating with a face image set for a respective distinct person each of the plurality of face images that is categorized as being of the respective distinct person. The method may further include determining the face image set of the owner to be a face image set of the plurality of face image sets having the greatest number of face images among the plurality of obtained face image sets.

In an embodiment of the present disclosure, the mobile terminal is configured to obtain a plurality of face images by, in response to each receipt of an unlock instruction by the mobile terminal, automatically capturing face images of a user who triggers a respective unlock instruction of the mobile terminal, using a camera or other image capture device associated with the mobile terminal. The mobile terminal may further be configured to obtain a plurality of face image sets by determining the face image set of the owner to be a face image set of the plurality of face image sets having the greatest number of face images among the plurality of obtained face image sets. In this way, the range of face images considered in determining which face image set is the face image set of the owner of the mobile terminal is narrowed, and the accuracy of determining the face image set of the owner of the mobile terminal may be improved.

In an embodiment of the present disclosure, the acquiring of the face image set of the owner of the mobile terminal includes acquiring self-shot face images from a stored image library and obtaining a plurality of face image sets. The obtaining of the plurality of face images sets may be obtained by categorizing each face image of the acquired self-shot face images as being of a respective person, and obtaining a face image set for each distinct person of the respective persons, by associating with a face image set for a respective distinct person each of the plurality of face images that is categorized as being of the respective distinct person. The method further includes determining the face image set of the owner to be a face image set of the plurality of face image sets having the greatest number of face images among the plurality of obtained face image sets.

In an embodiment of the present disclosure, the mobile terminal is configured to acquire self-shot face images from a stored image library and obtain a plurality of face image sets. The mobile terminal may further be configured to determine, from the obtained plurality of face image sets, a face image set in which the number of face images is the greatest as being the face image set of the owner of the mobile terminal. In this way, due to the rate of appearance of self-shot images during the taking of self-portraits, the range of face images considered in determining the face image set of the owner of the mobile terminal is narrowed, and the accuracy of determining the face image set of the owner of the mobile terminal may be improved.

In an embodiment of the present disclosure, the determining of the candidate contact includes determining, based on the determined age of the owner of the mobile terminal, an age group of a contact associated with the photo album to be shared. The determining of the candidate contact may further include obtaining respective ages of each of the plurality of contacts by performing age identification for respective stored contact photos of each of the plurality of contacts. The determining of the candidate contact may further include selecting the candidate contact from the plurality of contacts based on the obtained respective ages of the plurality of contacts and the determined age group.

In an embodiment of the present disclosure, the mobile terminal is configured to determine an age group of a contact associated with the photo album to be shared and to determine respective ages of each of a plurality of stored contacts, such that a candidate contact is quickly and effectively selected from the plurality of contacts based on the determined ages of the plurality of contacts and the determined age group. In this way, the range of contacts considered in the selecting of the candidate contact is narrowed, and the speed and accuracy of determining the candidate contact may be improved.

In an embodiment of the present disclosure, the selecting of the candidate contact from the plurality of contacts based on the obtained respective ages of each of the plurality of contacts and the determined age group includes selecting, based on the obtained respective ages of each of the plurality of contacts and from the plurality of contacts, contacts with respective ages falling within the age group. The selecting of the candidate contact may further include obtaining the candidate contact by screening the selected contacts based on contacting frequencies of the selected contacts.

In an embodiment of the present disclosure, the mobile terminal is configured to screen the selected contacts based on respective contacting frequencies of the selected contacts and to obtain a candidate contact. The mobile terminal may thus determine a contact closely associated with the owner of the mobile terminal as being the candidate contact. In this way, the accuracy of determining the candidate contact may be further improved.

In another embodiment of the present disclosure the obtaining a candidate contact by screening includes judging, based on respective contacting frequencies of the selected contacts, whether the selected contacts include a contact with a respective contacting frequency that is greater than a designated frequency. The obtaining a candidate contact by screening further includes, in response to a judgement that the selected contacts include a contact with a respective contacting frequency that is greater than the designated frequency, determining as being the candidate contact the contact with a respective contacting frequency that is greater than the designated frequency.

In an embodiment of the present disclosure, the mobile terminal is configured to judge whether the selected contacts include a contact with a contacting frequency that is greater than a designated frequency and to determine as being the candidate contact a contact with a contacting frequency that is greater than the designated frequency. The mobile terminal may thus be configured to determine a contact closely associated with the owner of the mobile terminal as the candidate contact. In this way, the accuracy of determining the candidate contact may further be improved.

In an embodiment of the present disclosure, after the judging the method further includes, in response to a judgment that the selected contacts do not comprise a contact with a respective contacting frequency that is greater than the designated frequency, acquiring a designated number of contacts from the selected contacts according to a descending order of respective contacting frequencies of the selected contacts. The method may further include determining as being candidate contacts the acquired contacts.

In an embodiment of the present disclosure, the mobile terminal is configured to, in response to a judgment that the selected contacts do not include a contact with a respective contacting frequency that is greater than a designated frequency, acquire a designated number of contacts from the selected contacts according to a descending order of respective contacting frequencies of the selected contacts. The mobile terminal is further configured to determine as being candidate contacts the acquired contacts, such that contacts closely associated with the owner of the mobile terminal may be determined as being the candidate contacts. In this way, the speed and accuracy of searching for contact information may be improved, and the search time may be saved.

The above optional technical solutions may be combined in any form to construct optional embodiments of the present disclosure, which are not necessarily described any further herein.

Figure 2:
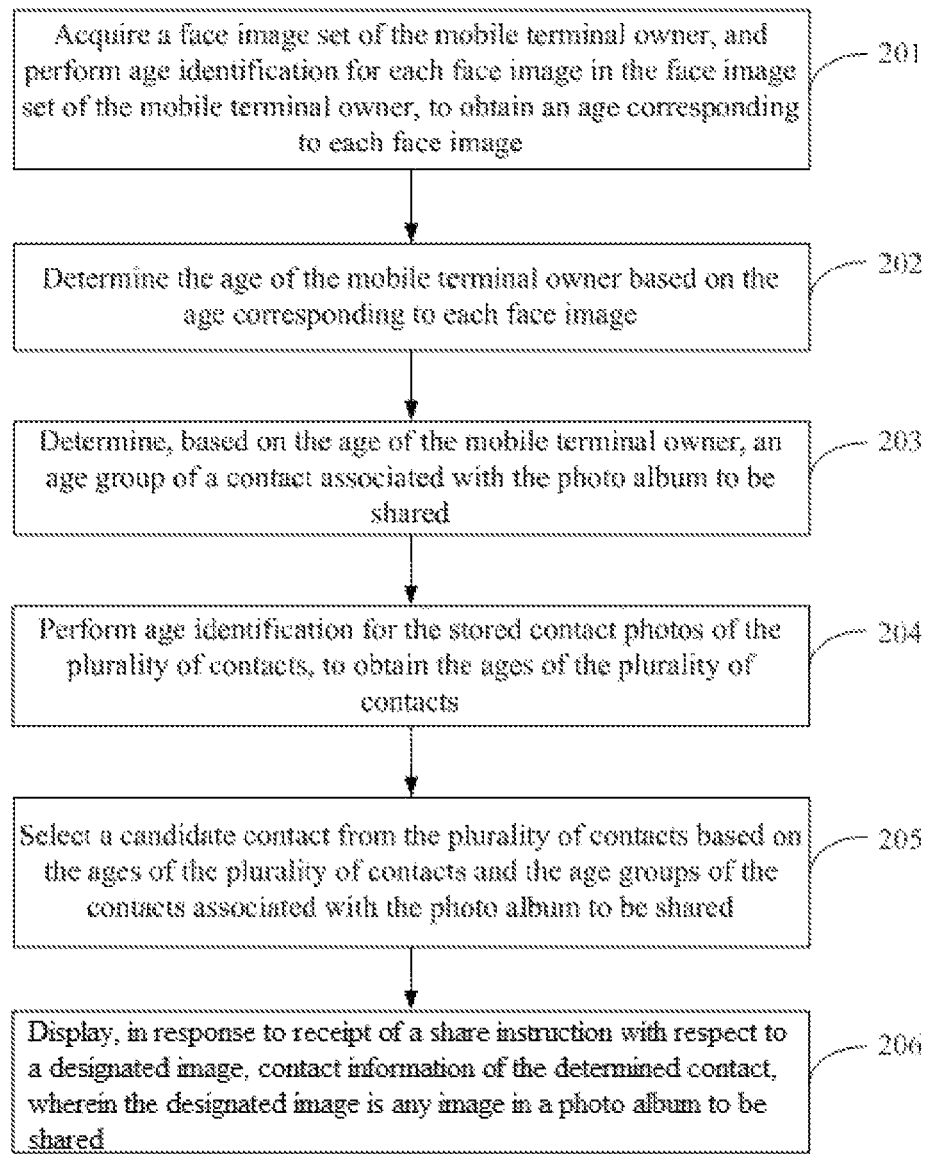
FIG. 2 is a flowchart illustrating a method for recommending contact information according to an exemplary embodiment of the present disclosure.

FIG. 2 is a flowchart illustrating a method for recommending contact information according to an exemplary embodiment of the present disclosure. As illustrated in FIG. 2, the method is applied in a terminal, and includes the following steps, which the terminal may be configured to execute.

In step 201, a face image set of the owner of the mobile terminal is acquired, and age identification is performed for each face image in the face image set of the owner of the mobile terminal, to obtain a respective age corresponding to each face image.

To determine the age of the owner of the mobile terminal, the mobile terminal may first acquire a face image set of the owner of the mobile terminal. The face image set of the owner of the mobile terminal may be acquired in the following two exemplary manners.

In a first manner, in response to each unlock instruction by the mobile terminal, the mobile terminal captures respective face images of a user triggering the unlock instruction in order to obtain a plurality of face images. The mobile terminal then categorizes each of the plurality of face images as being of a respective person. The mobile terminal then obtains a face image set for each distinct person of the respective persons, by associating with a face image set for a respective distinct person each of the plurality of face images that is categorized as being of a same respective distinct person. The mobile terminal then determines as being the face image set of the owner a face image set of the plurality of face image sets that has the greatest number of face images among the plurality of obtained face image sets.

For example, in response to each receipt of an unlock instruction, the mobile terminal calls a camera integrated therein or attached thereto, and uses the called camera to automatically capture face images of the user triggering the unlock instruction, to obtain a plurality of face images. The mobile terminal groups images determined to be of the same person into a respective face image set for that person, and thus obtains a plurality of face image sets from the plurality of face images. The user who triggers the unlock instruction could either be the owner of the mobile terminal, or another user using the mobile terminal. The number of times that the owner of the mobile terminal triggers the unlock instruction will likely be the greatest, compared with the number of times other users trigger the unlock instruction, and therefore the number of captured face images of the owner of the mobile terminal will also likely be greater than the number of captured face images of any other distinct person. Thus out of the plurality of face image sets acquired via categorization, the face image set having the greatest number of face images will likely be the face image set of the owner of the mobile terminal. Therefore, the mobile terminal selects a face image set that has the greatest number face images among the other face image sets. In other words, the mobile terminal selects a face image set having a number of face images in that set that is the greatest compared with the respective numbers of face images in the other face image sets. The mobile terminal determines that selected face image set to be the face image set of the owner of the mobile terminal.

The unlock instruction is used for unlocking the mobile terminal, and the unlock instruction is triggered by a user. As non-limiting examples, the user may trigger unlocking of the mobile terminal by using a slide unlock button, inputting an unlock password, drawing an unlock pattern or the like operation.

To categorize the plurality of face images to obtain a plurality of face image sets, the mobile terminal may perform face identification for each of the plurality of face images, and group the face images that are determined to be of the same person into a face image set for that respective person, to thus obtain a plurality of face image sets of distinct people. The specific operation for categorizing the plurality of face images may be implemented with reference to such relevant technologies as face recognition, which is not described in detail in the present disclosure.

In a second manner, the mobile terminal acquires self-shot face images from a stored image library. A self-shot face images may also be known as a self-captured face image, a self-taken image, a self-portrait, or a "selfie." The mobile terminal then categorizes each of the acquired self-shot face images as being of a respective person. The mobile terminal then obtains a face image set for each distinct person of the respective persons, by associating with a face image set for a respective distinct person each of the acquired self-shot face images that is categorized as being of the respective distinct person. The mobile terminal then determines that the face image set of the owner is the face image set of the plurality of face image sets that contains the highest number of face images.

Because self-shot face images, e.g. selfies, are generally captured using a front camera of the mobile terminal, e.g. the camera on the screen side of the mobile terminal, and the resolution in pixels of the front camera is generally lower than the resolution in pixels of the rear camera, the pixel value of a face image captured by the front camera of the mobile terminal is generally lower than the pixel value of a face image captured by the rear camera of the mobile terminal. As such, to acquire the self-shot face images from a stored image library, the mobile terminal may select from the image library a face image whose pixel value is lower than or equal to a designated pixel threshold, by comparing pixel values of face images in the library with the designated pixel threshold, and determine the selected face image as being a self-shot face image.

The designated pixel threshold may be predetermined. As non-limiting examples, the designated pixel threshold may be a pixel value of the front camera of the mobile terminal, an average value of pixel values of the front cameras of various currently market-available mobile terminals, or an average value of pixel values of all the face images in the image library. The designated pixel threshold may be stored in manner accessible to the mobile terminal, such as in a memory of the mobile terminal.

The specific operations for categorizing the acquired self-shot face images to obtain a plurality of face image sets, and for determining as being the face image set of the owner a face image set of the plurality of face image sets having the greatest number of face images among the plurality of obtained face image sets, may be similar to those operations as described in connection with the first manner.

The operation for performing age identification for each face image in the face image set of the owner of the mobile terminal to obtain the respective age corresponding to each face image may be implemented with reference to such relevant technologies as age identification technology, which is not described in detail in the present disclosure.

In step 202, the age of the owner of the mobile terminal is determined based on the respective age determined as corresponding to each face image.

To determine the age of the owner of the mobile terminal based on the respective age corresponding to each face image, the mobile terminal may screen out, i.e. eliminate from consideration, the highest age and the lowest age from the plurality of ages determined as corresponding to each of the face images, calculate an average value of the remaining ages, and determine the average value as being the age of the owner of the mobile terminal.

For example, an exemplary face image set of the owner of the mobile terminal may include five face images, respectively, an image 1, an image 2, an image 3, an image 4 and an image 5. The mobile terminal performs age identification for each of the five face images to determine an age of 25 as corresponding to image 1, an age of 27 as corresponding to image 2, an age of 29 as corresponding to image 3, an age of 28 as corresponding to image 4, and an age of 34 as corresponding to image 5. In this case, the mobile terminal screens out the highest age of 34 and the lowest age of 25 from the plurality of ages determined as corresponding to the five face images, calculates an average value of 28 from the remaining ages of 27, 29 and 28, and determines the average age of 28 as being the age of the owner of the mobile terminal.

To determine the age of the owner of the mobile terminal based on the age corresponding to each face image, the mobile terminal may also, based on a plurality of designated age groups and the respective age determined as corresponding to each face image, determine the number of face images falling within each designated age group, and select an age group in which fall the greatest number of face images. That is, a distribution of the number of the face images with determined corresponding ages falling in each of the designated age groups is determined. The designated age group into which the greatest number of face images fall has the highest probability of being the age group of the owner of the mobile terminal. Therefore, a designated age group having the highest probability of being the age group of the owner may be selected from the plurality of designated age groups based on having the greatest number of face images, and afterwards, the mobile terminal determines the age of the owner of the mobile terminal as being an average value of the respective ages determined as corresponding to the face images within the selected designated age group.

The plurality of designated age groups may be predetermined. To improve the accuracy of determining the age of the owner of the mobile terminal, each age group may have an equal age interval. As a non-limiting example, the plurality of designated age group may be 18-30, 31-43, 44-56 and the like. To further improve the accuracy of determining the age of the owner of the mobile terminal, the plurality of age groups may be defined with a finer granularity. As a non-limiting example, the plurality of designated age groups may be 18-25, 26-33, 34-41, 42-49, 50-57 and the like. The plurality of designated age groups may be stored in a manner accessible to the mobile terminal, such as in a memory of the mobile terminal.

For example, the mobile terminal may determine the age of 25 as corresponding to image 1, the age of 27 as corresponding to image 2, the age of 29 as corresponding to image 3, the age of 28 as corresponding to image 4, and the age of 34 as corresponding to image 5. With the plurality of designated age groups being 18-25, 26-33, 34-41, 42-49 and 50-57, the mobile terminal determines that the number of face images corresponding to the age group 18-25 is 1, the number of face images corresponding to the age group 26-33 is 3, the number of face images corresponding to the age group 34-41 is 1, and the numbers of face images corresponding to the age groups 42-49 and 50-57 are both 0. Therefore, the mobile terminal selects the age group 26-33, in which the number of face images is the greatest out of the plurality of designated age groups. The mobile terminal then determines an average value of 28 for the ages of 27, 28 and 29, which correspond respectively to image 2, image 3, and image 4, and which fall within the designated age group 26-33. The mobile terminal then determines the determined average value 28 as being the age of the owner of the mobile terminal.

However, in practical application, when the mobile terminal determines the age of the owner of the mobile terminal based on the respective age corresponding to each face image, the mobile terminal may determine the age of the owner of the mobile terminal in other manners, which are not limited to embodiments explicitly described in the present disclosure.

In step 203, an age group of a contact associated with the photo album to be shared is determined based on the age of the owner of the mobile terminal.

To determine information of a candidate contact based on age groups of contacts associated with the photo album to be shared, and thus to narrow the range of contacts considered in the determining of the candidate contact from a plurality of stored contacts and improve the speed of determining the candidate contact, the mobile terminal may, based on the age of the owner of the mobile terminal, determine the age group of the contacts associated with the photo album to be shared. The operation of determining, by the mobile terminal, and based on the age of the owner of the mobile terminal, the age group of the contacts associated with the photo album to be shared may be specifically as follows. The mobile terminal determines photo album attributes of the photo album to be shared. The mobile terminal also determines the contacts associated with the photo album to be shared. The mobile terminal then acquires a corresponding age difference range using a stored corresponding relationship between the photo album attributes, contacts, and age difference ranges. The mobile terminal uses the determined age of the owner of the mobile terminal and the acquired corresponding age difference range to obtain an age group within which fall ages of contacts associated with the photo album to be shared. To obtain the age group within which fall ages of contacts associated with the photo album to be shared, the mobile terminal adds the age of the owner of the mobile terminal and the highest value within the age difference range, to thereby obtain the highest age value of the age group within which fall the ages of the contacts associated with the photo album to be shared. The mobile terminal also adds the age of the owner of the mobile terminal and the lowest value within the age difference range, to thereby obtain the lowest age value of the age group within which fall the ages of the contacts associated with the photo album to be shared. The obtained highest and lowest values of the age group within which fall the ages of the contacts associated with the photo album to be shared may thus define that age group.

The photo album attributes of the photo album to be shared may be determined based on photo album name, respective ages corresponding to the face images in the photo album to be shared, and the like. The photo album attributes of the photo album to be shared may be used for identifying a family relationship between the photo album to be shared and the owner of the mobile terminal. To determine the contacts associated with the photo album to be shared, the mobile terminal may acquire a corresponding contact based on the photo album attributes of the photo album to be shared by using a stored corresponding relationship between photo album attributes and contacts, and determine the acquired contact as being a contact associated with the photo album to be shared.

For example, assume that the age of the owner of the mobile terminal is 28, that the photo album attribute of the photo album to be shared is that it is a baby's photo album, and that the contacts associated with the photo album to be shared are the grandfather, grandmother, maternal grandfather and maternal grandmother of the contact. Then, based on it being a baby's photo album and the contacts associated with the photo album to be shared being the grandfather, grandmother, maternal grandfather and maternal grandmother of the contact, the mobile terminal acquires, from a stored corresponding relationship between photo album attributes, contacts, and age difference ranges as listed in Table 1, a corresponding age difference range of [20, 30]. The mobile terminal then adds the age of the owner of the mobile terminal, i.e. the age of 28, to the highest value 30 within the age difference range, and obtains a highest value 58 of the age group within which fall the ages of the contacts associated with the photo album to be shared. The mobile terminal also adds the age of the owner of the mobile terminal, i.e. the age of 28, to the lowest value 20 within the age difference range and obtains a lowest value 48 of the age group within which fall the ages of the contacts associated with the photo album to be shared. The mobile terminal thus determines that the age group within which fall the ages of the contacts associated with the photo album to be shared is the ages in the range [48, 58].

TABLE 1

| Photo album attribute | Contact | Range of age difference |
|---|---|---|
| Baby's photo album | grandfather, grandmother, maternal grandfather, maternal grandmother | [20, 30] |
| Parents' photo album | brothers, sisters | [0, 5] |
| . . . | . . . | . . . |

The corresponding relationship between photo album attributes, contacts and age difference ranges listed in Table 1 is an example. However, the present disclosure is not limited to the relationship shown in Table 1.

In step 204, age identification is performed for the stored contact photos of the plurality of contacts, to obtain the respective ages of the plurality of contacts.

When the mobile terminal stores contact information, respective contact photos of the contacts may be stored in the mobile terminal. Therefore, the mobile terminal may acquire the respective contact photos of a plurality of contacts, and perform age identification for each of the acquired plurality of contact photos to obtain the respective ages of the plurality of contacts.

For example, if the number of contacts is 5, and the plurality of contacts are respectively a contact 1, a contact 2, a contact 3, a contact 4 and a contact 5, the mobile terminal performs age identification for the respective stored contact photos of the plurality of contacts to determine that the age of contact 1 is 20, the age of contact 2 is 36, the age of contact 3 is 49, the age of contact 4 is 51, and the age of contact 5 is 55.

The operation of performing age identification for the respective contact photos of the plurality of contacts to obtain the respective ages of the plurality of contacts may be similar to the operation for performing age identification in step 201 for each face image in the face image set of the owner of the mobile terminal, and both operations may be implemented with reference to such relevant technologies as age identification technology. Therefore, the description of this embodiment gives no further explicit details regarding those aspects.

In step 205, one or more candidate contacts are selected from the plurality of contacts based on the age group of the contacts associated with the photo album to be shared and the determined respective ages of the plurality of contacts.

To recommend the contact information and improve the image sharing efficiency when a designated image is shared, the mobile terminal may select a candidate contact from the plurality of contacts based on the age group of the contacts associated with the photo album to be shared and the determined respective ages of the plurality of contacts. The operation for selecting by the mobile terminal a candidate contact from the plurality of contacts based on the age group of the contacts associated with the photo album to be shared and the determined respective ages of the plurality of contacts may be as follows: Based on the determined respective ages of the plurality of contacts, the mobile terminal selects, from the plurality of contacts, contacts whose ages fall within the age group of the contacts associated with the photo album to be shared. The mobile terminal then obtains a candidate contact by screening the selected contacts based on contacting frequencies of the selected contacts. The mobile terminal then determines a selected contact that passes through the screening operation to be a candidate contact.

That is, based on the determined respective ages of the plurality of contacts, the mobile terminal selects, from the plurality of contacts, contacts whose respective ages fall within the age group of the contacts associated with the photo album to be shared. Since there may be multiple selected contacts, to further improve the accuracy of determining the candidate contact, the mobile terminal may screen the selected contacts based on respective contacting frequencies of the selected contacts to obtain a candidate contact.

For example, the mobile terminal may determine that the age of contact 1 is 20, the age of contact 2 is 36, the age of contact 3 is 49, the age of contact 4 is 51, and the age of contact 5 is 55. With an age group of [48, 58], the mobile terminal thus selects, from the plurality of contacts, contacts 3, 4 and 5 whose ages fall within the age group [48, 58]. The mobile terminal then screens the selected contacts based on the respective contacting frequencies of selected contact 3, contact 4, and contact 5, to obtain a candidate contact.

The operation for obtaining a candidate contact by screening by the mobile terminal the selected contacts based on the respective contacting frequencies of the selected contacts may be as follows. The mobile terminal judges, based on the respective contacting frequencies of the selected contacts, whether the selected contacts include a contact with a respective contacting frequency that is greater than a designated frequency. Then in response to a judgment that the selected contacts include a contact with a respective contacting frequency that is greater than the designated frequency, the mobile terminal determines as being a candidate contact the contact whose contacting frequency is greater than the designated frequency.

For example, the mobile terminal acquires the number of contacting times between a selected contact and the mobile terminal within a first designated time duration, calculates a ratio of the number of contacting times to the first designated time duration, and determines the calculated ratio as being a contacting frequency of the selected contact. The mobile terminal judges, based on the respective contacting frequencies of the selected contacts, whether the selected contacts include a contact with a respective contacting frequency that is greater than a designated frequency. If the selected contacts include a contact with a contacting frequency that is greater than the designated frequency, in response, the mobile terminal determines as being the candidate contact the contact whose contacting frequency is greater than the designated frequency.

As non-limiting examples, the number of contacting times of the selected contact within the first designated time duration may be one or more of the number of conversation times, the number of short message times, or contacting times of other applications used for communication. The contacting times may be between the selected contact and the mobile terminal. The first designated time duration may be predefined. As non-limiting examples, the first designated time duration may be 30 days, 50 days, 60 days or the like. The first designated may be stored in a manner accessible to the mobile terminal, such as in a memory of the mobile terminal.

The designated frequency may be predefined. As non-limiting examples, the designated frequency may be 2 contacts per day, 3 contacts per day, or the like. The designated frequency may be stored in a manner accessible to a mobile terminal, such as in a memory of the mobile terminal.

For example, assume a first designated time duration is 30 days, and the designated frequency is 2 contacts per day. Assume further that the mobile terminal determines that within the first designated time duration, the number of contacting times of contact 3 is 36, the number of contacting times of contact 4 is 30, and the number of contacting times of contact 5 is 6. The mobile terminal then calculates a ratio of the number of contacting times of each contact to the first designated time duration to obtain a contacting frequency 1.2 contacts per day of contact 3, a contacting frequency of 1 contact per day of contact 4, and a contacting frequency of 0.2 contacts per day of contact 5. In this case, the mobile terminal judges, based on the contacting frequencies of the selected contacts, that none of selected contact 3, contact 4 and contact 5 include a respective contacting frequency that is greater than the designated frequency of 2 contacts per day.

When the selected contacts do not include a contact with a respective contacting frequency that is greater than a designated frequency, the mobile terminal acquires a designated number of contacts from the selected contacts according to a descending order of the respective contacting frequencies. The mobile terminal then determines the acquired contacts as being candidate contacts.

For example, assume that the designated number is 2. When the mobile terminal judges, based on the respective contacting frequencies of the selected contacts, that none of the selected contact 3, contact 4, and contact 5 include a respective contacting frequency that is greater than the designated frequency 2, the mobile terminal in response acquires, from the selected contacts, two contacts, i.e. contact 3 and contact 4, according to a descending order of the contacting frequencies. In other words, the mobile terminal determines which two contacts have the highest and second highest respective contacting frequencies, and thereby determines acquired contact 3 and contact 4 as being the candidate contacts because they are the selected contacts with the highest and second highest respective contacting frequencies.

To reduce the complexity of the determining of the candidate contact(s), the mobile terminal may directly screen the selected contacts based on the acquired number of contacting times of the selected contacts within the first designated time duration, to obtain the candidate contact. The operation for obtaining the candidate contacts by screening by the mobile terminal the selected contacts based on the number of contacting times of the selected contacts within the first designated time duration is similar to the above operation for obtaining the candidate contact by screening the selected contacts based on the contacting frequencies of the selected contact, and is thus not described in further detail in the present disclosure.

In step 206, in response to receipt of a share instruction with respect to a designated image, contact information of the determined candidate contact is displayed, wherein the designated image is any image in a photo album to be shared.

In order to improve the speed of searching for contact information to be shared from the stored plurality of contact information, in response to receiving the share instruction with respect to the designated image, the mobile terminal may display, to the user, the contact information of the determined candidate contact, such that the user can then directly select the contact information of the candidate contact. In this way, the designated image is shared.

The mobile terminal may recommend the contact information of the candidate contact by automatically popping up the contact information of the candidate contact on the mobile terminal display. For quicker and more effective selection of the contact information of the candidate contact, the popped up contact information may include only the name of the candidate contact and contact information allowing the user to share a photo with the candidate contact, with no need to display other information such as contact photo, Email, address, and the like.

The share instruction with respect to the designated image is used for sharing the designated image, and the share instruction with respect to the designated image is triggered by the user through a designated operation. As non-limiting examples, the designated operation may be a click operation, a slide operation, a voice operation, or the like.

For example, when the designated image is any image in a baby's photo album, and the candidate contact is a contact associated with the photo album to be shared, to enhance contacting frequency among family members associated with the photo album to be shared, and improve the speed of searching for contact information to be shared from the stored plurality of contact information, in response to receiving the share instruction with respect to the designated image, the mobile terminal may display the contact information of the candidate contact. That is, the mobile terminal may display, to the user, the contact information of the grandfather, grandmother, maternal grandfather, maternal grandmother, and the like of the baby, such that the user can directly select the contact information of the family members from the contact information of the candidate contacts. The displaying of the candidate contact information by the mobile terminal may be done automatically. In this way, the designated image is shared.

When the mobile terminal is configured to share a plurality of images in the baby's photo album, the mobile terminal may separately select the plurality of images from the baby's photo album. In response to receiving an image confirmation instruction, the mobile terminal may simultaneously share the selected plurality of images to improve the efficiency of sharing the plurality of images.

The image confirmation instruction is used for confirming that the plurality of images are successfully selected, and the image confirmation instruction is triggered by the user through an operation such as, clicking an acknowledge button, clicking an enter key, a clicking send key, or the like. As additional non-limiting examples, the designated operation may be a click operation, a slide operation, a voice operation, or the like.

Because a time at which the candidate contact is determined (through steps 201 to 205) may be prior to a time of receiving the share instruction with respect to the designated image, the mobile terminal does not need to repeatedly perform steps 201 to 205 each time the image is shared, which improves the speed of sharing the images. In the process of determining the candidate contact through steps 201 to 205, a face image of a user triggering an unlock instruction may be captured, or the images in the image library may be updated, at any time. Specifically, the mobile terminal may capture a new face image, or the user may delete or add an image in the image library, at any time. Because a contacting frequency of a contact may vary from time to time, in order to update the one or more candidate contacts without delay, to improve the accuracy of determining the candidate contact, and to avoid a heavy burden on the mobile terminal, the mobile terminal may periodically update the one or more candidate contacts through steps 201 to 205.

The length of a period between updates of the candidate contacts may be a second designated duration, and the second designated duration may be predefined. For example, the second designated duration may be one week, two weeks, one month or the like. The second designated duration may be stored in a memory of the mobile terminal. The mobile terminal may also decide to update the candidate contacts once because the updated number of face images captured due to the unlock instruction trigger, or the updated number of images in the image library, reaches a first value. As non-limiting examples, the first value may be 10, 20 or the like. The mobile terminal may also decide to update the candidate contacts once because a change rate of contacting frequency of the contact is a second value. The change rate of contacting frequency is a change rate between the contacting frequency within a previous period and the contacting frequency at the current time. That is, a difference between the contacting frequency within a previous period and the contacting frequency at the current time is divided by a time difference between the previous period and the current time. As non-limiting examples, the second value may be 0.5, 1, 2 or the like.

The mobile terminal may not only display a candidate contact based on the method for recommending contact information in steps 201 to 206, but also may determine the candidate contact in real time upon receiving a share instruction with respect to a designated image, and automatically display the determined candidate contact. To be specific, upon receiving a share instruction with respect to a designated image, the mobile terminal determines an age of an owner of the mobile terminal, determines, based on the age of the owner of the mobile terminal and stored contact photos of a plurality of contacts, the candidate contact from the plurality of contacts, and automatically displays to the user of the mobile terminal the contact information of the candidate contact, which improves the accuracy of determining the candidate contact.

According to the above-described methods, in response to receipt of a share instruction with respect to a designated image, a candidate contact is determined and then contact information of the determined candidate contact is displayed. Although the candidate contact may be determined in real time, which improves the accuracy of determining the candidate contact, a heavy burden may be put on the mobile terminal because then the candidate contact is re-determined each time an image is shared. Therefore, during sharing of images the contact information of the candidate contact may be optionally displayed by using the methods provided in steps 201 to 206.

In embodiments of the present disclosure, the mobile terminal determines an age of an owner of a mobile terminal, selects a contact associated with the photo album to be shared from the plurality of contacts based on the determined age of the owner of the mobile terminal and stored contact photos of a plurality of contacts, and determines the candidate contact based on the contacting frequency of the selected contact. In this way, upon receiving the share instruction with respect to the designated image, the mobile terminal displays the contact information of the candidate contact, which improves the speed and accuracy of searching for the contact information, reduces search time, and improves the image sharing efficiency.

Figure 3:
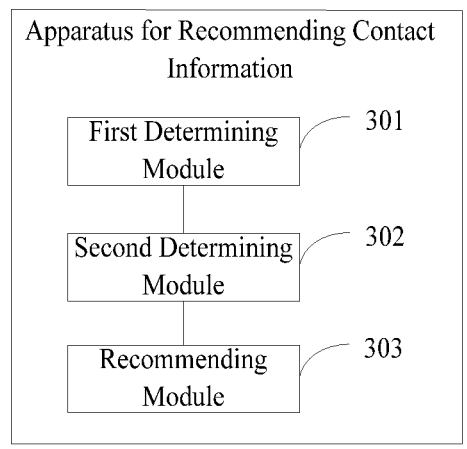
FIG. 3 is a block diagram illustrating an apparatus for recommending contact information according to an exemplary embodiment of the present disclosure.

FIG. 3 is a block diagram illustrating an apparatus for recommending contact information according to an exemplary embodiment of the present disclosure. The apparatus for recommending contact information of FIG. 3 may be a mobile terminal. Referring to FIG. 3, the apparatus includes: a first determining module 301, a second determining module 302, and a recommending module 303.

The first determining module 301 is configured to determine an age of an owner of a mobile terminal.

The second determining module 302 is configured to determine, based on the determined age of the owner of the mobile terminal and stored contact photos of a plurality of contacts, a candidate contact from the plurality of contacts.

The recommending module 303 is configured to display, in response to receiving a share instruction with respect to a designated image, contact information of the determined candidate contact, the designated image being any image in a photo album to be shared.

Figure 4:
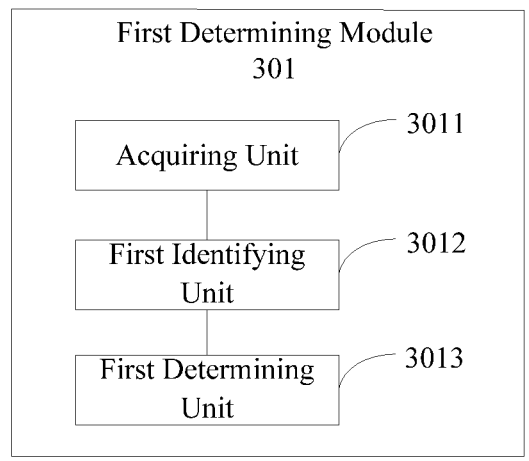
FIG. 4 is a block diagram illustrating a first determining module according to an exemplary embodiment of the present disclosure.

In an embodiment of the present disclosure, referring to FIG. 4, the first determining module 301 includes: an acquiring unit 3011, a first identifying unit 3012, and a first determining unit 3013.

The acquiring unit 3011 is configured to acquire a face image set of the owner of the mobile terminal, and may include either or both of acquiring unit 3011*a* and acquiring unit 3011*b*.

The first identifying unit 3012 is configured to perform age identification for each face image in the face image set of the owner of the mobile terminal, to obtain a respective age corresponding to each face image.

The first determining unit 3013 is configured to determine the age of the owner of the mobile terminal based on the respective age corresponding to each face image.

Figure 5:
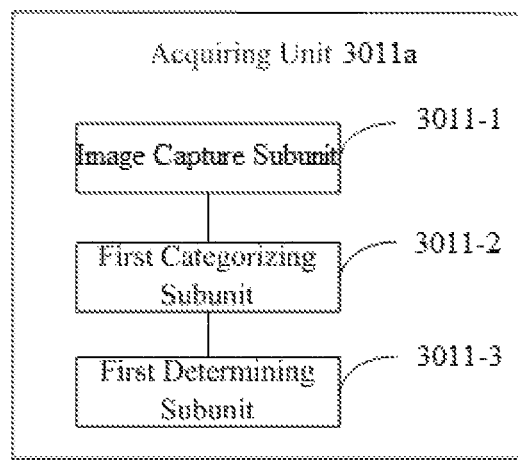
FIG. 5 is a block diagram illustrating an acquiring unit according to an exemplary embodiment of the present disclosure.

In an embodiment of the present disclosure, referring to FIG. 5, the acquiring unit 3011*a* includes: an image capturing subunit 3011-1, a first categorizing subunit 3011-2, and a first determining subunit 3011-3.

The image capturing subunit 3011-1 is configured to obtain a plurality of face images by, in response to each receiving of an unlock instruction, capturing a face image of a user triggering the unlock instruction.

The first categorizing subunit 3011-2 is configured to obtain a plurality of face image sets by categorizing each face image of the plurality of face images as being of a respective person, and obtaining a face image set for each distinct person of the respective persons, by associating with a face image set for a respective distinct person each of the plurality of face images that is categorized as being of the respective distinct person.

The first determining subunit 3011-3 is configured to determine the face image set of the owner to be a face image set of the plurality of face image sets having the highest number of face images among the plurality of obtained face image sets.

Figure 6:
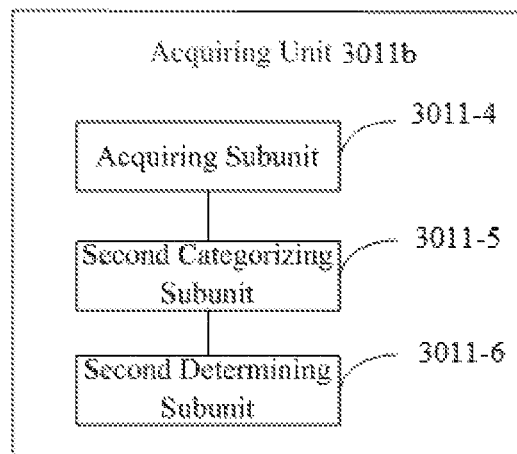
FIG. 6 is a block diagram illustrating an acquiring unit according to an exemplary embodiment of the present disclosure.

In an embodiment of the present disclosure, referring to FIG. 6, the acquiring unit 3011*b* includes: an acquiring subunit 3011-4, a second categorizing subunit 3011-5, and a second determining subunit 3011-6.

The acquiring subunit 3011-4 is configured to acquire self-shot face images from a stored image library.

The second categorizing subunit 3011-5 is configured to obtain a plurality of face image sets by categorizing each face image of the acquired self-shot face images as being of a respective person, and obtaining a face image set for each distinct person of the respective persons, by associating with a face image set for a respective distinct person each of the acquired self-shot face images that is categorized as being of the respective distinct person.

The second determining subunit 3011-6 is configured to determine the face image set of the owner to be a face image set of the plurality of face image sets having the greatest number of face images among the plurality of obtained face image sets.

Figure 7:
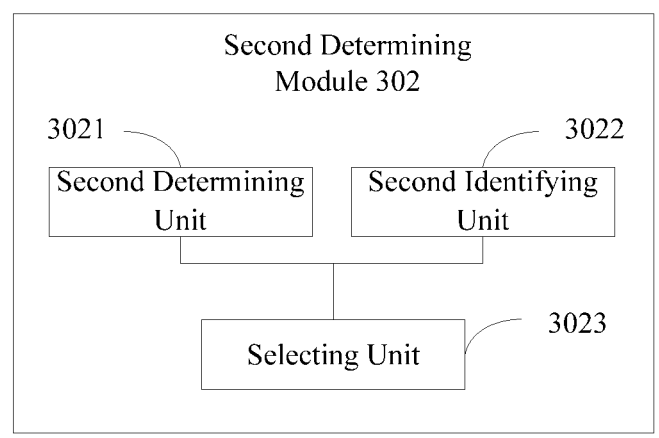
FIG. 7 is a block diagram illustrating a second determining module according to an exemplary embodiment of the present disclosure.

In an embodiment of the present disclosure, referring to FIG. 7, the second determining module 302 includes: a second determining unit 3021, a second identifying unit 3022, and a selecting unit 3023.

The second determining unit 3021 is configured to determine, based on the age of the owner of the mobile terminal, an age group of a contact associated with the photo album to be shared.

The second identifying unit 3022 is configured to perform age identification for the stored contact photos of the plurality of contacts, to obtain the respective ages of the plurality of contacts.

The selecting unit 3023 is configured to select a candidate contact from the plurality of contacts based on the obtained respective ages of the plurality of contacts and the determined age group.

Figure 8:
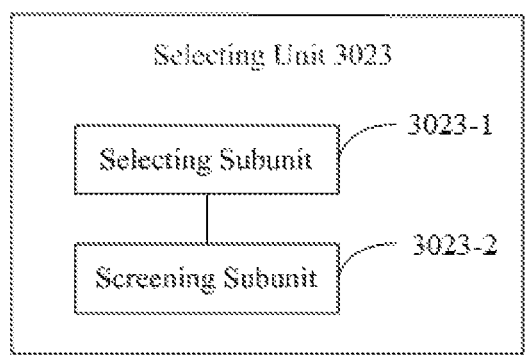
FIG. 8 is a block diagram illustrating a selecting unit according to an exemplary embodiment of the present disclosure.

In an embodiment of the present disclosure, referring to FIG. 8, the selecting unit 3023 includes a selecting subunit 3023-1 and a screening subunit 3023-2.

The selecting subunit 3023-1 is configured to select, based on the obtained respective ages of each of the plurality of contacts, contacts from the plurality of contacts with respective ages falling within the determined age group.

The screening subunit 3023-2 is configured to obtain a candidate contact by screening the selected contacts based on respective contacting frequencies of the selected contacts.

In an embodiment of the present disclosure, the screening subunit 3023-2 is specifically configured to judge, based on respective contacting frequencies of the selected contacts, whether the selected contacts include a contact with a respective contacting frequency that is greater than a designated frequency. The screening subunit 3023-2 is further specifically configured to, in response to a judgement that the selected contacts include a contact with a respective contacting frequency that is greater than the designated frequency, determine as the candidate contact the contact with a contacting frequency that is greater than the designated frequency.

In an embodiment of the present disclosure, the screening subunit 3023-2 is further specifically configured to in response to a judgement that the selected contacts do not include a contact with a respective contacting frequency that is greater than a designated frequency, acquire a designated number of contacts from the selected contacts according to a descending order of respective contacting frequencies. The screening subunit 3023-2 is further configured to determine as candidate contacts the acquired contacts.

In embodiments of the present disclosure, an age of an owner of a mobile terminal is determined and a candidate contact is determined from the plurality of contacts based on the determined age of the owner of the mobile terminal and stored contact photos of a plurality of contacts. Further, in response to receipt of a share instruction with respect to a designated image, contact information of the determined candidate contact is displayed, wherein the designated image is any image in a photo album to be shared. In this way, the speed and accuracy of searching for contact information may be improved, the search time may be reduced, and the image sharing efficiency may be enhanced.

With respect to the apparatuses in the above embodiments, the specific implementations of operations executed by various modules, units, and subunits thereof have been described in detail in the embodiments illustrating similar respective operations of the disclosed methods, and are not described herein any further.

Figure 9:
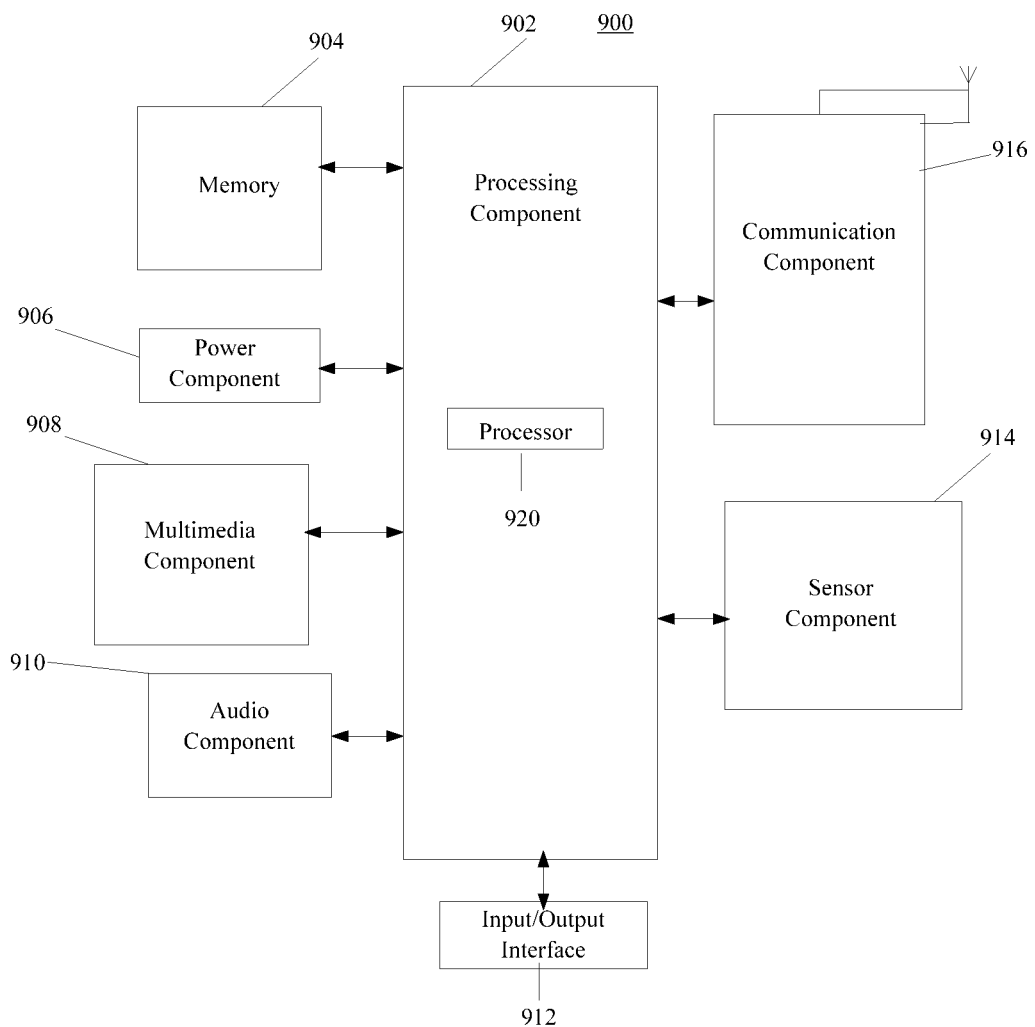
FIG. 9 is a block diagram illustrating an apparatus for recommending contact information according to an exemplary embodiment of the present disclosure.

FIG. 9 is a block diagram illustrating an apparatus 900 for recommending contact information according to an exemplary embodiment of the present disclosure. For example, the apparatus 900 may be a mobile phone, a computer, a digital broadcast terminal, a messaging device, a gaming console, a tablet, a medical device, exercise equipment, a personal digital assistant, and the like. Apparatus 900 may generally be, include, or be a component of a mobile terminal as referenced elsewhere in this disclosure.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 920 to execute instructions to perform all or a part of the steps in the above-described methods. In addition, the processing component 902 may include one or more modules which facilitate the interaction between the processing component 902 and other components. For example, the processing component 902 may include a multimedia module to facilitate the interaction between the multimedia component 908 and the processing component 902. Processing component 902 may include any or all of modules 301-303 and their respective units and subunits.

The memory 904 is configured to store various types of data to support the operations of the apparatus 900. Examples of such data include instructions for any application or method operated on the apparatus 900, contact data, phonebook data, messages, pictures, videos, and the like. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power supplies, and other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive external multimedia data when the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, or a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and a peripheral interface module, such as a keyboard, a click wheel, a button, or the like. The buttons may include, but are not limited to, a home button, a volume button, a starting button, and a locking button.

The sensor component 914 includes one or more sensors to provide status assessments of various aspects of the apparatus 900. For example, the sensor component 914 may detect an open/closed status of the apparatus 900, relative positioning of components, e.g., the display and the keypad, of the apparatus 900; the sensor component 914 may further detect a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate wired or wireless communications between the apparatus 900 and other devices. The apparatus 900 may access a wireless network based on a communication standard, such as WiFi, 2G; or 3G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 904, executable by the processor 920 in the apparatus 900, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Each module, unit, or subunit discussed above, such as first determining module 301, second determining module 302, recommending module 303, acquiring unit 3011a, first identifying unit 3012, first determining unit 3013, acquiring unit 3011b, image capturing subunit 3011-1, first categorizing subunit 3011-2, first determining subunit 3011-3, acquiring subunit 3011-4, second categorizing subunit 3011-5, second determining subunit 3011-6, second determining unit 3021, second identifying unit 3022, selecting unit 3023, selecting subunit 3023-1, and screening subunit 3023-2, may take the form of a packaged functional hardware unit designed for use with other components, a portion of a program code (e.g., software or firmware) executable by the processor 920 or the processing circuitry that usually performs a particular function of related functions, or a self-contained hardware or software component that interfaces with a larger system, for example.

Figure 10:
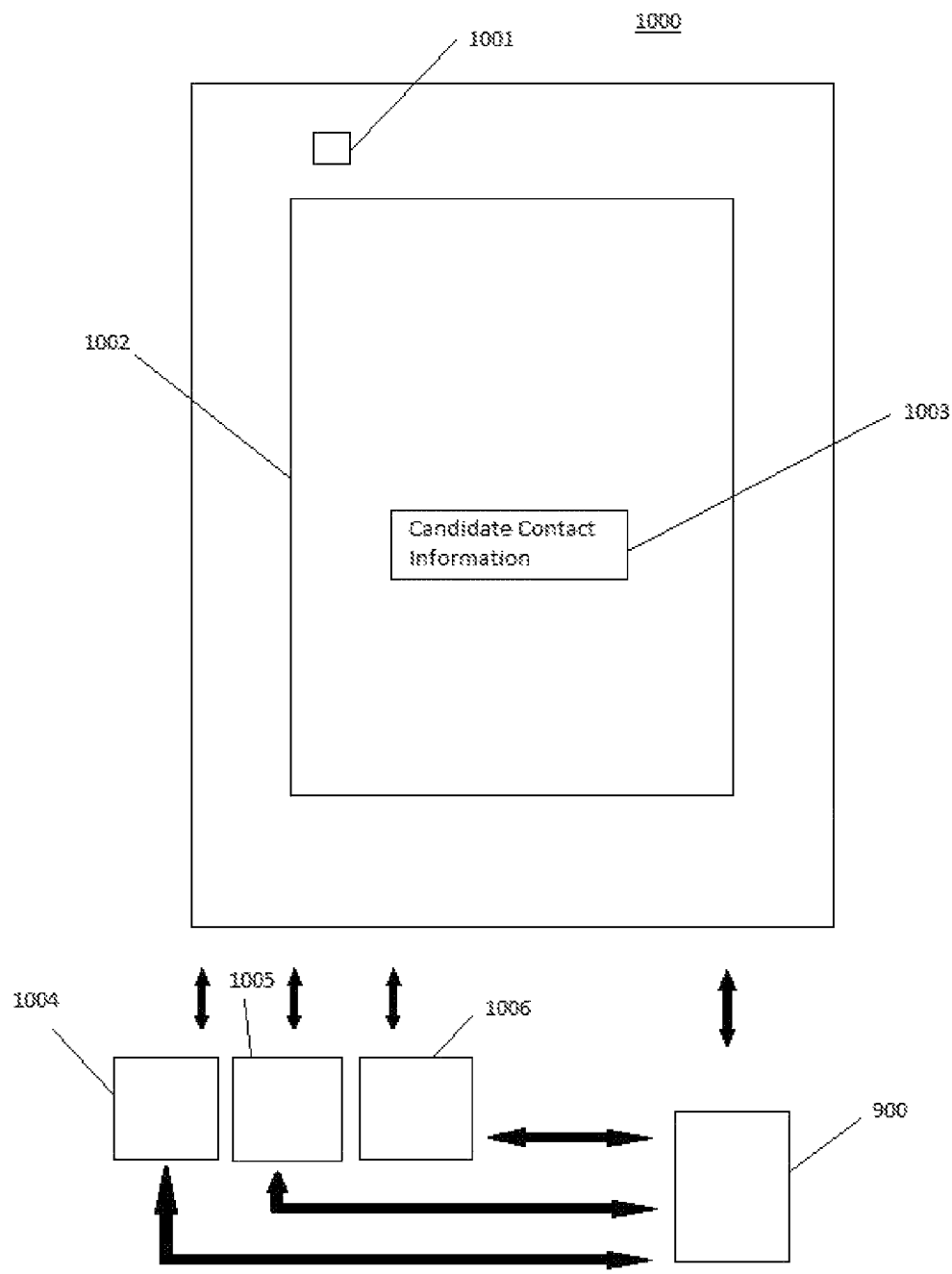
FIG. 10 is a block diagram illustrating a mobile terminal according to an exemplary embodiment of the present disclosure.

FIG. 10 is a block diagram of an exemplary embodiment of a mobile terminal 1000. Mobile terminal 1000 is in communication with an embodiment of apparatus 900. In an embodiment, mobile terminal 1000 includes an embodiment of apparatus 900 including at least components 902 and 904 described above, and optionally further including components 906-916 described above. Processing component 902 is configured to execute operations of the methods and modules of this disclosure. Mobile terminal 1000 further includes an image capture device 1001. Image capture device 1001 may be a camera or similar device that receives or generates external multimedia data when the mobile terminal 1000 is in an operation mode, such as a photographing mode or a video mode. Image capture device 1001 may include a fixed optical lens system or have focus and optical zoom capability, and may also include a light sensor, such as a CMOS or CCD image sensor, configured to capture images. Image capture device 1001 may be configured to perform any operations disclosed as being executed by cameras or image capture devices in this disclosure. Mobile terminal 1000 further includes a display device 1002. Display device 1002 may be a screen on the mobile terminal providing an output interface between the mobile terminal 1000 and the user. Display device 1002 may include a liquid crystal display and a touch panel configured to to receive input signals from the user. Display device 1002 is configured to perform any operations disclosed as being executed by displays or screens in this disclosure, including receiving share instructions and unlock instructions, and displaying recommendations of contact information of a determined contact. Mobile terminal 1000 is in communication with contact photos 1004, a photo album 1005, and a stored image library 1006. Contact photos 1004, photo album 1005, and stored image library 1006 are accessible to processing component 902, and may be stored in memory 904. Image capture device 1001 and display device 1002 are controlled by and in communication with processing component 902 according to the methods and modules of this disclosure. FIG. 10 depicts display device 1002 in a state of displaying a popped up recommendation of contact information of a candidate contact determined by processing component 902 according to operations of this disclosure.

A non-transitory computer-readable storage medium is provided. When instructions stored in the storage medium are executed by a processor of a mobile terminal, the mobile terminal is caused to perform a method for recommending contact information, by performing any of the operations performed above. For example, an embodiment of the instructions cause the mobile terminal to determine an age of an owner of a mobile terminal and determine, based on the determined age of the owner and stored contact photos of a plurality of contacts, a candidate contact from the plurality of contacts. An embodiment of the instructions may further cause the mobile terminal to display, in response to receiving a share instruction with respect to a designated image, contact information of the determined candidate contact, the designated image being any image in a photo album to be shared.

In an embodiment of the non-transitory computer-readable storage medium of the present disclosure, the instructions to cause the mobile terminal to determine of an age of an owner of a mobile terminal include instructions to cause the mobile terminal to acquire a face image set of the owner. The instructions may further include instructions to cause the mobile terminal to obtain a respective age corresponding to each face image in the face image set of the owner by performing age identification for each face image in the face image set of the owner. The instructions may further include instructions to cause the mobile terminal to determine the age of the owner based on the respective age corresponding to each face image in the face image set of the owner.

In an embodiment of the non-transitory computer-readable storage medium of the present disclosure, the instructions to cause the mobile terminal to acquire a face image set of the owner of the mobile terminal include instructions to cause the mobile terminal to obtain a plurality of face images by, in response to each receiving of an unlock instruction by the mobile terminal, capturing a respective face image of a user who triggers a respective unlock instruction and to obtain a plurality of face image sets. The instructions may further include instructions to cause the mobile terminal to obtain the plurality of face image sets by categorizing each face image of the plurality of face images as being of a respective person, and by obtaining a face image set for each distinct person of the respective persons, by associating with a face image set for a respective distinct person each of the plurality of face images that is categorized as being of the respective distinct person. The instructions may further include instructions to cause the mobile terminal to determine the face image set of the owner to be a face image set of the plurality of face image sets having the greatest number of face images among the plurality of obtained face image sets.

In an embodiment of the non-transitory computer-readable storage medium of the present disclosure, the instructions to cause the mobile terminal to acquire a face image set of the owner of the mobile terminal may further comprise instructions to cause the mobile terminal to acquire self-shot face images from a stored image library and to obtain a plurality of face image sets. The instructions may further include instructions to cause the mobile terminal to obtain the plurality of face image sets by categorizing each face image of the acquired self-shot face images as being of a respective person, and obtaining a face image set for each distinct person of the respective persons, by associating with a face image set for a respective distinct person each of the acquired self-shot face images that is categorized as being of the respective distinct person. The instructions may further include instructions to cause the mobile terminal to determine the face image set of the owner to be a face image set of the plurality of face image sets having the greatest number of face images among the plurality of obtained face image sets In an embodiment of the non-transitory computer-readable storage medium of the present disclosure, the instructions to cause the mobile terminal to determine, based on the determined age of the owner of the mobile terminal and stored contact photos of a plurality of contacts, of a candidate contact from the plurality of contacts may further include instructions to cause the mobile terminal to determine, based on the determined age of the owner, an age group of a contact associated with the photo album to be shared. The instructions may further include instructions to cause the mobile terminal to obtain respective ages of each of the plurality of contacts by performing age identification for respective stored contact photos of each of the plurality of contacts. The instructions may further include instructions to cause the mobile terminal to select the candidate contact from the plurality of contacts based on the obtained respective ages of the plurality of contacts and the determined age group.

In an embodiment of the non-transitory computer-readable storage medium of the present disclosure, the instructions to cause the mobile terminal to select of a candidate contact from the plurality of contacts based on the obtained respective ages of the plurality of contacts and the determined age group include further instructions to cause the mobile terminal to select, based on the obtained respective ages of each of the plurality of contacts, contacts from the plurality of contacts with respective ages falling within the determined age group. The instructions may further include instructions to cause the mobile terminal to obtain the candidate contact by screening the selected contacts based on contacting frequencies of the selected contacts In an embodiment of the non-transitory computer-readable storage medium of the present disclosure, the instructions to cause the mobile terminal to obtain the contact by screening the selected contacts based on contacting frequencies of the selected contacts further include instructions to cause the mobile terminal to judge, based on respective contacting frequencies of the selected contacts, whether the selected contacts include a contact with a respective contacting frequency that is greater than a designated frequency. The instructions may further include instructions to cause the mobile terminal to judge, based on respective contacting frequencies of the selected contacts, whether the selected contacts include a contact with a respective contacting frequency that is greater than a designated frequency. The instructions may further include instructions to cause the mobile terminal to in response to a judgment that the selected contacts include a contact with a respective contacting frequency that is greater than the designated frequency, determine as a candidate contact the contact with a respective contacting frequency that is greater than the designated frequency In an embodiment of the non-transitory computer-readable storage medium of the present disclosure, the instructions to cause the mobile terminal to obtain the contact by screening the selected contacts based on contacting frequencies of the selected contacts further includes instructions to cause the mobile terminal to judge, based on respective contacting frequencies of the selected contacts, whether the selected contacts include a contact with a respective contacting frequency that is greater than a designated frequency. The instructions may further include instructions to cause the mobile terminal to, in response to a judgment that the selected contacts do not include a contact with a respective contacting frequency that is greater than a designated frequency, acquire a designated number of contacts from the selected contacts according to a descending order of respective contacting frequencies. The instructions may further include instructions to cause the mobile terminal to determine as candidate contacts the acquired contacts.

In embodiments of the present disclosure, an age of an owner of a mobile terminal is determined, a candidate contact is determined from the plurality of contacts based on the determined age of the owner of the mobile terminal and stored contact photos of a plurality of contacts; and in response to receipt of a share instruction with respect to a designated image, contact information of the determined candidate contact is displayed, wherein the designated image is any image in a photo album to be shared. In this way, the speed and accuracy of searching for contact information may be improved, the search time may be reduced, and the image sharing efficiency may be enhanced.

The methods, devices, and modules described above may be implemented in many different ways and as hardware, software or in different combinations of hardware and software. For example, all or parts of the implementations may be a processing circuitry that includes an instruction processor, such as a central processing unit (CPU), microcontroller, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Other embodiments of the present disclosure will be apparent to those skilled in the art upon consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and examples be considered as exemplary only, with a true scope and spirit of the present disclosure being indicated by the appended claims.

It will be appreciated that the present disclosure is not limited to the exact constructions that have been described above and illustrated in the accompanying drawings, and that various modifications and changes can be made without departing from the scope thereof. The scope of the present disclosure is only defined by the appended claims.

The invention claimed is:

1. A method for recommending contact information, comprising:
   determining, by a processor, an age of an owner of a mobile terminal;
   determining, by a processor, based on the determined age of the owner and stored contact photos of a plurality of contacts, a candidate contact from the plurality of contacts; and
   displaying, by a processor, in response to receiving a share instruction with respect to a designated image, contact information of the determined candidate contact, the designated image being any image in a photo album to be shared;
   wherein the determining of the age of the owner comprises:
      acquiring a face image set of the owner;
      obtaining a respective age corresponding to each face image in the face image set of the owner by performing age identification for each face image in the face image set of the owner; and
      determining the age of the owner based on the respective age corresponding to each face image in the face image set of the owner; and
   wherein the acquiring of the face image set of the owner comprises:
      acquiring self-shot face images from a stored image library;
      obtaining a plurality of face image sets by:
         categorizing each face image of the acquired self-shot face images as being of a respective person, and
         obtaining a face image set for each distinct person of the respective persons, by associating with a face image set for a respective distinct person each of the acquired self-shot face images that is categorized as being of the respective distinct person; and
      determining the face image set of the owner to be a face image set of the plurality of face image sets having the greatest number of face images among the plurality of obtained face image sets.

2. The method of claim 1, wherein the determining, based on the determined age of the owner and stored contact photos of the plurality of contacts, of the candidate contact from the plurality of contacts comprises:
   determining, based on the determined age of the owner, an age group of a contact associated with the photo album to be shared;
   obtaining respective ages of each of the plurality of contacts by performing age identification for respective stored contact photos of each of the plurality of contacts; and
   selecting the candidate contact from the plurality of contacts based on the obtained respective ages of the plurality of contacts and the determined age group.

3. The method of claim 2, wherein the selecting of the candidate contact from the plurality of contacts based on the obtained respective ages of each of the plurality of contacts and the determined age group comprises:
   selecting, based on the obtained respective ages of each of the plurality of contacts, contacts from the plurality of contacts with respective ages falling within the determined age group; and
   obtaining the candidate contact by screening the selected contacts based on contacting frequencies of the selected contacts.

4. The method of claim 3, wherein the obtaining of the candidate contact by screening the selected contacts based on contacting frequencies of the selected contacts comprises:
   judging, based on respective contacting frequencies of the selected contacts, whether the selected contacts comprise a contact with a respective contacting frequency that is greater than a designated frequency; and
   in response to a judgement that the selected contacts comprise a contact with a respective contacting frequency that is greater than the designated frequency, determining as the candidate contact the contact with a respective contacting frequency that is greater than the designated frequency.

5. The method of claim 3, wherein the obtaining of the candidate contact by screening the selected contacts based on contacting frequencies of the selected contacts comprises:
   judging, based on respective contacting frequencies of the selected contacts, whether the selected contacts comprise a contact with a respective contacting frequency that is greater than a designated frequency;
   in response to a judgment that the selected contacts do not comprise a contact with a respective contacting frequency that is greater than the designated frequency, acquiring a designated number of contacts from the selected contacts according to a descending order of respective contacting frequencies of the selected contacts; and determining as candidate contacts the acquired contacts.

6. An apparatus for recommending contact information, comprising:

a processor; and a memory for storing instructions executable by the processor;

wherein the processor is configured to:

determine an age of an owner of a mobile terminal;

determine, based on the determined age of the owner of the mobile terminal and stored contact photos of a plurality of contacts, a candidate contact from the plurality of contacts; and display, in response to receiving a share instruction with respect to a designated image, contact information of the determined candidate contact, the designated image being any image in a photo album to be shared;

wherein the processor is further configured to:

acquire a face image set of the owner;

obtain a respective age corresponding to each face image in the face image set of the owner by performing age identification for each face image in the face image set of the owner; and determine the age of the owner based on the respective age corresponding to each face image in the face image set of the owner; and wherein, the processor is further configured to:

acquire self-shot face images from a stored image library;

obtain a plurality of face image sets by:

categorizing each face image of the acquired self-shot face images as being of a respective person, and obtaining a face image set for each distinct person of the respective persons, by associating with a face image set for a respective distinct person each of the acquired self-shot face images that is categorized as being of the respective distinct person; and determine the face image set of the owner to be a face image set of the plurality of face image sets having the greatest number of face images among the plurality of obtained face image sets.

7. The apparatus of claim 6, wherein the processor is further configured to:

determine, based on the determined age of the owner, an age group of a contact associated with the photo album to be shared;

obtain respective ages of each of the plurality of contacts by performing age identification for respective stored contact photos of each of the plurality of contacts; and select the candidate contact from the plurality of contacts based on the obtained respective ages of the plurality of contacts and the determined age group.

8. The apparatus of claim 7, wherein the processor is further configured to:

select, based on the obtained respective ages of each of the plurality of contacts, contacts from the plurality of contacts with respective ages falling within the determined age group; and obtain the candidate contact by screening the selected contacts based on contacting frequencies of the selected contacts.

9. The apparatus of claim 8, wherein the processor is further configured to:

judge, based on respective contacting frequencies of the selected contacts, whether the selected contacts comprise a contact with a respective contacting frequency that is greater than a designated frequency; and in response to a judgement that the selected contacts comprise a contact with a respective contacting frequency that is greater than the designated frequency, determine as the candidate contact the contact with a respective contacting frequency that is greater than the designated frequency.

10. The apparatus of claim 8, wherein the processor is further configured to:

judge, based on respective contacting frequencies of the selected contacts, whether the selected contacts comprise a contact with a respective contacting frequency that is greater than a designated frequency;

in response to a judgment that the selected contacts do not comprise a contact with a respective contacting frequency that is greater than the designated frequency, acquire a designated number of contacts from the selected contacts according to a descending order of respective contacting frequencies of the selected contacts; and determine as candidate contacts the acquired contacts.

11. A method for recommending contact information, comprising:

determining, by a processor, an age of an owner of a mobile terminal;

determining, by a processor, based on the determined age of the owner and stored contact photos of a plurality of contacts, a candidate contact from the plurality of contacts;

displaying, by a processor, in response to receiving a share instruction with respect to a designated image, contact information of the determined candidate contact, the designated image being any image in a photo album to be shared;

wherein the determining of the age of the owner comprises:

acquiring a face image set of the owner;

obtaining a respective age corresponding to each face image in the face image set of the owner by performing age identification for each face image in the face image set of the owner; and determining the age of the owner based on the respective age corresponding to each face image in the face image set of the owner; and wherein the acquiring of the face image set of the owner comprises:

obtaining a plurality of face images by, in response to each receiving of an unlock instruction by the mobile terminal, causing an image capture device to capture a respective face image of a user who triggers a respective unlock instruction;

obtaining a plurality of face image sets by:

categorizing each face image of the plurality of face images as being of a respective person, and obtaining a face image set for each distinct person of the respective persons, by associating with a face image set for a respective distinct person each of the plurality of face images that is categorized as being of the respective distinct person; and determining the face image set of the owner to be a face image set of the plurality of face image sets having the greatest number of face images among the plurality of obtained face image sets.

12. The method of claim 11, wherein the determining, based on the determined age of the owner and stored contact photos of the plurality of contacts, of the candidate contact from the plurality of contacts comprises:
   determining, based on the determined age of the owner, an age group of a contact associated with the photo album to be shared;
   obtaining respective ages of each of the plurality of contacts by performing age identification for respective stored contact photos of each of the plurality of contacts; and
   selecting the candidate contact from the plurality of contacts based on the obtained respective ages of the plurality of contacts and the determined age group.

13. The method of claim 12, wherein the selecting of the candidate contact from the plurality of contacts based on the obtained respective ages of each of the plurality of contacts and the determined age group comprises:
   selecting, based on the obtained respective ages of each of the plurality of contacts, contacts from the plurality of contacts with respective ages falling within the determined age group; and
   obtaining the candidate contact by screening the selected contacts based on contacting frequencies of the selected contacts.

14. The method of claim 13, wherein the obtaining of the candidate contact by screening the selected contacts based on contacting frequencies of the selected contacts comprises:
   judging, based on respective contacting frequencies of the selected contacts, whether the selected contacts comprise a contact with a respective contacting frequency that is greater than a designated frequency; and
   in response to a judgement that the selected contacts comprise a contact with a respective contacting frequency that is greater than the designated frequency, determining as the candidate contact the contact with a respective contacting frequency that is greater than the designated frequency.

15. The method of claim 13, wherein the obtaining of the candidate contact by screening the selected contacts based on contacting frequencies of the selected contacts comprises:
   judging, based on respective contacting frequencies of the selected contacts, whether the selected contacts comprise a contact with a respective contacting frequency that is greater than a designated frequency;
   in response to a judgment that the selected contacts do not comprise a contact with a respective contacting frequency that is greater than the designated frequency, acquiring a designated number of contacts from the selected contacts according to a descending order of respective contacting frequencies of the selected contacts; and
   determining as candidate contacts the acquired contacts.

* * * * *